(12) United States Patent
Drescher et al.

(10) Patent No.: US 7,542,863 B2
(45) Date of Patent: Jun. 2, 2009

(54) POSITION MEASURING SYSTEM

(75) Inventors: Joerg Drescher, Riedering (DE);
Markus Meissner, Pittenhart (DE)

(73) Assignee: Dr. Johannes Heidenhain GmbH,
Traunreut (DE)

( * ) Notice: Subject to any disclaimer, the term of this patent is extended or adjusted under 35 U.S.C. 154(b) by 9 days.

(21) Appl. No.: 11/591,220

(22) Filed: Oct. 31, 2006

(65) Prior Publication Data

US 2007/0180725 A1 Aug. 9, 2007

Related U.S. Application Data

(60) Provisional application No. 60/735,515, filed on Nov. 10, 2005, provisional application No. 60/842,187, filed on Sep. 1, 2006.

(30) Foreign Application Priority Data

Nov. 9, 2005 (DE) ........................ 10 2005 053 789
Sep. 1, 2006 (DE) ........................ 10 2006 041 357

(51) Int. Cl.
*G06F 19/00* (2006.01)
*G01R 31/14* (2006.01)
(52) U.S. Cl. ........................ 702/94; 702/95; 702/105; 702/190; 365/614
(58) Field of Classification Search ........... 702/94, 702/95, 105, 108, 116–123, 182, 189, 190; 356/449, 521, 194, 614; 370/379, 395, 916; 324/207.25, 765; 374/137; 341/155
See application file for complete search history.

(56) References Cited

U.S. PATENT DOCUMENTS

| | | | | |
|---|---|---|---|---|
| 4,392,142 A | * | 7/1983 | Seachman et al. | 347/81 |
| 4,794,251 A | * | 12/1988 | Scholian | 250/231.17 |
| 5,640,170 A | * | 6/1997 | Anderson | 343/895 |
| 6,494,616 B1 | * | 12/2002 | Tokhtuev et al. | 374/137 |
| 6,828,783 B2 | * | 12/2004 | Schroter et al. | 324/207.25 |
| 2002/0027191 A1 | * | 3/2002 | Min et al. | 250/231.13 |

(Continued)

FOREIGN PATENT DOCUMENTS

DE 101 58 223 6/2003

(Continued)

OTHER PUBLICATIONS

International Search Report, PCT International Application No. PCT/EP2006/010525, dated Mar. 14, 2007.

*Primary Examiner*—Eliseo Ramos Feliciano
*Assistant Examiner*—Phuong Huynh
(74) *Attorney, Agent, or Firm*—Kenyon & Kenyon LLP

(57) ABSTRACT

A position-measuring system is for measuring the position of an object, movable in several degrees of freedom, relative to a stationary object. The position-measuring system includes at least one measuring graduation that is joined to one of the objects, as well as a plurality of scanning units which are joined to the other object and which generate raw position signals based on the optical scanning of the measuring graduation. Moreover, a multiplexer unit is provided, the raw position signals generated by the scanning units being supplied to the multiplexer unit, and from there, the raw position signals of the various scanning units being transmitted in time multiplex operation to a downstream sequential electronics, without converting the raw position signals into position values beforehand.

17 Claims, 3 Drawing Sheets

U.S. PATENT DOCUMENTS

| | | | |
|---|---|---|---|
| 2004/0096220 A1* | 5/2004 | Murata | 398/79 |
| 2006/0241400 A1* | 10/2006 | Bucholz | 600/424 |
| 2007/0058173 A1 | 3/2007 | Holzapfel | |

FOREIGN PATENT DOCUMENTS

| | | |
|---|---|---|
| DE | 10 2005 043 569 | 3/2007 |
| EP | 1 019 669 | 7/2000 |
| WO | WO 99/17073 | 4/1999 |
| WO | WO 02/33358 | 4/2002 |
| WO | WO 2005/088261 | 9/2005 |

\* cited by examiner

POSITION MEASURING SYSTEM

CROSS-REFERENCE TO RELATED APPLICATIONS

The present application claims the benefit of U.S. Provisional Application No. 60/735,515, filed on Nov. 10, 2005, and U.S. Provisional Application No. 60/842,187, filed on Sep. 1, 2006.

FIELD OF THE INVENTION

The present invention relates to a position-measuring system.

BACKGROUND INFORMATION

In semiconductor manufacturing devices, it is necessary to precisely determine the spatial position of certain movable objects such as traversing tables. To that end, usually position-measuring systems are used, which make position information available on the output side. A computer-controlled sequencing control is possible in these devices based on the position information ascertained. Thus, for example, in wafer steppers, the position of mask and wafer must be measured very precisely in all 6 degrees of freedom (6DOF). In conventional methods, this position measuring is mainly carried out using several laser interferometers. The relative position of movable components with respect to a so-called metrology frame is determined in a conventional manner via the laser interferometers. In the future, it must be assumed that the stringent accuracy requirements of the position measuring, accompanied at the same time by increasing traversing speeds of the various parts, will further increase. While, for instance, until now, accuracy requirements of a few nm at speeds of approximately 1 m/s are specified, in the future, required subnanometer accuracies at markedly higher speeds must be assumed. However, given such high accuracy requirements, laser interferometers can no longer be used as position-measuring systems, since the refractive-index fluctuations in the ambient air, even given optimal air conditioning, lead to unacceptable measured-value fluctuations of several nm in the position measuring.

For this reason, alternative position-measuring systems have already been proposed for devices of this type. Thus, it is described, for instance, in European Published Patent Application No. 1 019 669 to use optical position-measuring systems having so-called cross gratings as a two-dimensional (grating-)measuring graduation, that is, grating-based position-measuring systems. Systems of this type are scarcely influenced by possible fluctuations in the refractive index of the air, and therefore allow easily reproducible position measurements.

To determine the position of movable objects, i.e., thus, for instance, of traversing tables, in all degrees of freedom, a plurality of measured quantities (at least 1 measured value per degree of freedom) that are independent of each other must be determined simultaneously for that purpose. To that end, generally a plurality of scanning units of a position-measuring system are mounted at various positions on each traversing table.

In that context, a single scanning unit is in each case able to measure one axis independent of the other scanning units, or also several axes in combination. In this configuration, in which the measuring graduation of the position-measuring system is secured to the motionless part of the machine (metrology frame), the scanning units must be mounted on the moving traversing tables, and the measurement data of the scanning units must be transmitted to a stationary sequential electronics via a cable trailing device. At the same time, it is necessary for the dynamic performance of the machine to keep the moving masses and the dynamic forces introduced by the cable trailing device in response to movement of the traversing table as small as possible. Particularly in highly dynamic and at the same time highly precise applications, very high requirements arise for the smallest possible masses and unit volume. Because of the demand for a highly precise measurement of the position in these applications, at the same time, very great demands result for a distortion-free and interference-free transmission of the position-specific measurement data to a sequential electronics often far away (up to >10 m) from the traversing table. The individual scanning-unit data are processed by the sequential electronics to obtain a position of the traversing table in all degrees of freedom and made available to a sequencing and motion control.

The motors for driving the traversing table are situated at or in the immediate vicinity of the traversing table. Strong electromagnetic fields are thereby formed which, in particular, can falsify analog measuring signals that are transmitted on long electrical lines. On the other hand, robust, interference-immune line drivers in the individual scanning units and adequately shielded signal lines from each scanning unit to the sequential electronics disadvantageously influence the mass and the unit volume of the scanning unit and traversing table. Because the scanning units are mounted on the traversing table, additional supply lines and signal lines are necessary in the cable trailing device between the traversing table and the stationary components, these lines disadvantageously influencing the inert mass and stiffness of this cable trailing device, as well.

It is necessary to keep the power loss, introduced at the traversing table by the scanning units and the signal transmission, as low as possible, in order to minimize heating of the traversing table or parts thereof, since this results directly in a measuring error.

Therefore, even when using grating-based position-measuring systems, a number of problems result which must be solved in order to ensure a sufficiently accurate determination of position.

SUMMARY

Example embodiments of the present invention provide a position-measuring system that includes a plurality of scanning units as well as at least one grating-based measuring graduation, which provides that the further processing of the scanning or position signals, generated by the scanning units, is as free of error as possible, accompanied at the same time by a low expenditure.

A position-measuring system is provided for measuring the position of an object, movable in several degrees of freedom, relative to a stationary object, includes: at least one measuring graduation which is joined to one of the objects; a plurality of scanning units which are joined to the other object, and which generate raw or unconditioned position signals from the optical scanning of the measuring graduation; and a multiplexer unit, the raw position signals generated by the scanning units being supplied to the multiplexer unit, and from there, the raw position signals of the various scanning units being transmitted in time multiplex operation to a downstream sequential electronics, without converting the raw position signals into position values beforehand.

The multiplexer unit may include a digitizing device, in order to convert the supplied raw position signals into electrically transmittable raw digital signals that are transmittable in time multiplex operation to the sequential electronics.

In this context, the raw position signals supplied by the scanning units to the multiplexer unit may be optical signals and may be transmitted to the multiplexer unit via optical fibers, a conversion device being disposed in the multiplexer unit for converting the optical signals into electrical signals, which are then able to be supplied to the digitizing device.

Alternatively, the raw position signals supplied by the scanning units to the multiplexer unit may be electrical signals and may be transmitted to the multiplexer unit via electrical signal lines, the electrical signals being able to be supplied to the digitizing device.

The digitizing device may be disposed on the side of the scanning units in order to convert the raw position signals, obtained during the optical scanning, into raw digital signals which are transmittable to the multiplexer unit.

The multiplexer unit may include a single line-driver unit which is usable for transmitting the raw position signals of all scanning units to the sequential electronics.

Moreover, the multiplexer unit may include a correction device for supplementing the raw position signals, to be transmitted to the sequential electronics, with further secondary information.

In this context, the correction device may be suitable for generating and preparing at least one type of the following secondary information for transmission to the sequential electronics: error information; correction information; diagnostic information; and status information.

In addition, the multiplexer unit may include one or more further central functional units that are usable jointly by a plurality of scanning units.

In this connection, the multiplexer unit may include at least one of the following central functional units: energy-supply functional unit; scanning-pulse functional unit; and clock-receiving functional unit.

Moreover, as a central functional unit, the multiplexer unit may include a decoder unit which permits information that is to be transmitted to the sequential electronics, to be coded using an error-redundant data code.

The multiplexer unit may also include a multiplex stage which prepares the raw position signals, supplied in parallel or concurrently by the scanning units, for the transmission of the raw position signals of the various scanning units in time multiplex operation to a downstream sequential electronics.

According to an example embodiment of the present invention, a position-measuring system for measuring the position of an object, movable in several degrees of freedom, relative to a stationary object includes: at least one measuring graduation joined to a first one of the objects; a plurality of scanning units joined to a second one of the objects and adapted to generate raw position signals based on optical scanning of the measuring graduation; and a multiplexer unit, the scanning units adapted to supply the raw position signals to the multiplexer unit, the multiplexer unit adapted to transmit the raw position signals in a time multiplex operation to a downstream sequential electronics without conversion of the raw position signals into position values beforehand.

Further details and aspects of example embodiments of the present invention are described in more detail below with reference to the attached figures.

DETAILED DESCRIPTION

Figure 1:
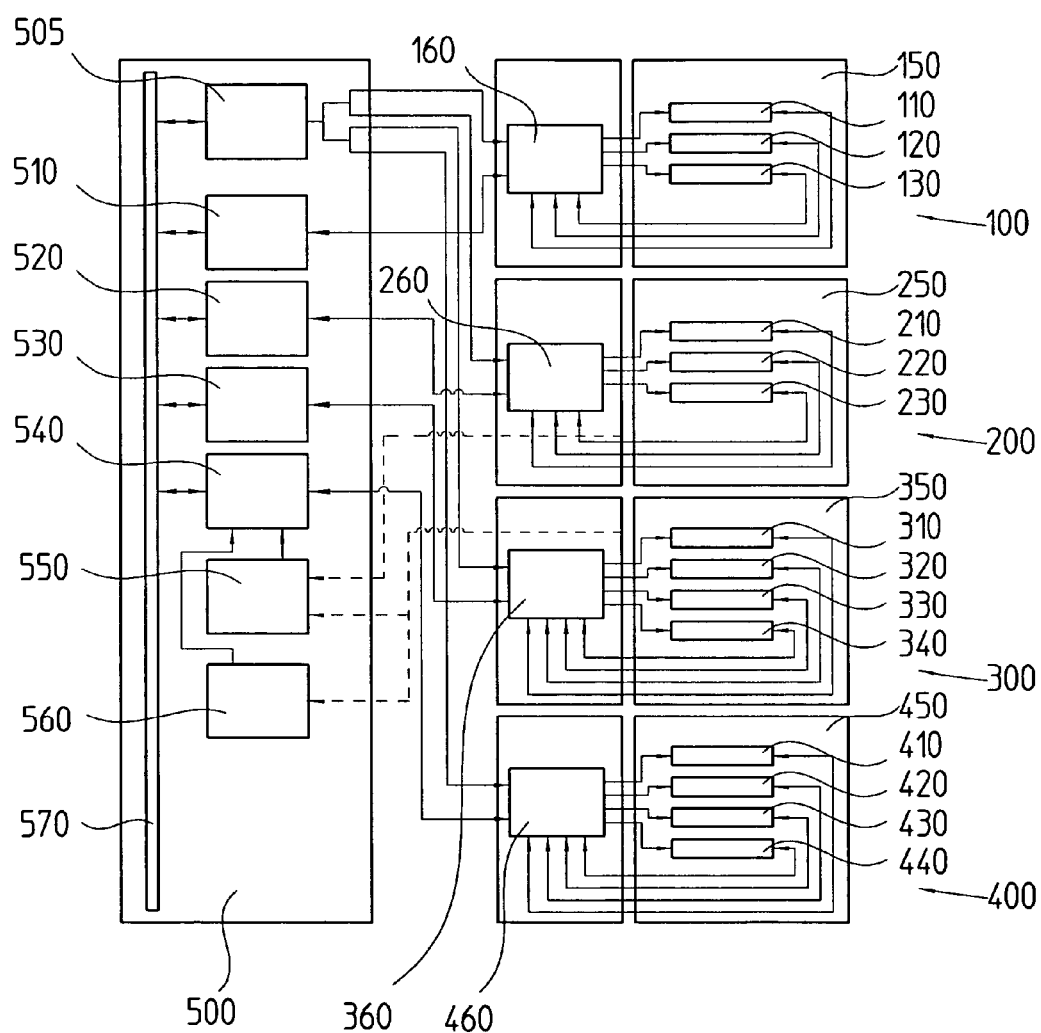
FIG. 1 is a schematic view of the architecture of an overall system made up of a plurality of position-measuring systems and a downstream sequential electronics.

FIG. 1 is a schematic block diagram of the architecture of an overall system made up of four position-measuring systems 100, 200, 300, 400 according to an example embodiment of the present invention, and a sequential electronics 500 including various functional components 505, 510-540, 550, 560, 570. The signals from various position-measuring systems 100, 200, 300, 400 are supplied to sequential electronics 500 for further processing. In addition, various signals for synchronization purposes, etc., are supplied by sequential electronics 500 to various position-measuring systems 100, 200, 300, 400.

In the present example, on the side of position-measuring systems 100, 200, 300, 400, in each case several scanning units 110-130, 210-230, 310-340, 410-440 are provided per position-measuring system 100, 200, 300, 400. The plurality of scanning units 110-130, 210-230, 310-340, 410-440 of a position-measuring system 100, 200, 300, 400 are in each instance assigned to a movable object 150, 250, 350, 450 on a machine, e.g., a traversing table. The various scanning units 110-130, 210-230, 310-340, 410-440 of a position-measuring system 100, 200, 300, 400 deliver a totality of position signals which, on the evaluation side, make it possible to determine with extreme precision the spatial position in six degrees of freedom for respective movable object 150, 250, 350, 450. For this purpose, depending on the requirement, a different number of scanning units 110-130, 210-230, 310-340, 410-440 may be assigned to each position-measuring system 100, 200, 300, 400. In the example illustrated, a total of four traversing tables are provided as movable objects 150, 250, 350, 450 of a machine, the associated position-measuring systems 100, 200, 300, 400 including three or four scanning units 110-130, 210-230, 310-340, 410-440.

The raw position signals generated by various position-measuring devices or systems 100, 200, 300, 400 are in each case supplied to an interpolation electronics 510, 520, 530, 540 on the side of sequential electronics 500. The term raw position signals should be understood signals which contain position information, even if it must still possibly be converted by suitable operations into a concrete position value. For instance, such raw position signals may be phase values that result directly from the scanning of the measuring graduation by scanning units 110-130, 210-230, 310-340, 410-440. For example, the actual position values are derived from the phase values by offsetting with various correction values such as, for instance, signal amplitudes, signal angles and other variables which, in part, are obtained from the measured values of the other scanning units 110-130, 210-230, 310-340, 410-440.

Interpolation electronics 510, 520, 530, 540 on the side of sequential electronics 500, which are assigned to each position-measuring system 100, 200, 300, 400, calculate the position of individual scanning units 110-130, 210-230, 310-340, 410-440 in a conventional manner from the raw position signals. Basically, well-known but computing-intensive interpolation algorithms and signal-correction algorithms may be used for this purpose. The computing power required for these algorithms is also the reason why the generated raw position signals are not already converted into position values in scanning units 110-130, 210-230, 310-340, 410-440 or in position-measuring systems 100, 200, 300, 400, but rather, the raw position signals are transmitted per position-measuring system 100, 200, 300, 400 in time multiplex operation to sequential electronics 500. The output signals of various interpolation electronics 510, 520, 530, 540 are supplied via a suitable data bus 570 to a superordinate control unit of the machine for further processing. The control unit ultimately controls the machine or the necessary sequences of movements of movable objects 150, 250, 350, 450 on the machine on the basis of the position information.

One jointly utilized light source may be provided per position-measuring system 100, 200, 300, 400, via which, in pulsed operation, a time-synchronous position determination of all scanning units 110-130, 210-230, 310-340, 410-440 of a position-measuring system 100, 200, 300, 400 is possible. In connection with the pulsed operation of the light source, reference is made specifically to the contents of European Published Patent Application No. 1 334 332.

Moreover, on the side of sequential electronics 500, a superordinate synchronization device 505 is provided, via which the light sources of various position-measuring systems 100, 200, 300, 400 are synchronized. For instance, synchronization device 505 includes a clock-generating unit, via which, for example, an optical synchronization clock pulse is able to be generated that is transmittable via suitable optical fibers to the light sources of the various position-measuring systems. Alternatively, an electrical synchronization clock pulse may also be transmitted via suitable signal lines that are stable for the transit time.

Also on the side of sequential electronics 500 may be a correction device, which may be used in conventional manner to correct the raw position signals, transmitted to sequential electronics 500, with respect to signal errors, etc. For instance, it may be a correction device 550 for measuring differential time, as well as a correction device 560 for measuring wavelength.

In a simplest case, for example, the differential time(s) between 2 (or more) light sources to be synchronized may be provided as correction value of the correction device 550 for the differential-time measurement. From it (them), using the known traversing speed, it is possible in a conventional manner to ascertain a position, corrected by this (these) differential time(s), in respective interpolation electronics 510, 520, 530, 540.

For instance, in a simplest case, the instantaneous wavelength at the moment of measurement or a position dependent upon it in known manner or another measured variable may be transferred as correction value of the correction device 560 for the wavelength measurement. Using the known dependence of the measured position on the measured wavelength, this position may easily be corrected by a possible change in the wavelength.

The raw position signals, generated by scanning units 110-130, 210-230, 310-340, 410-440 of a position-measuring system 100, 200, 300, 400 based on the optical scanning of a measuring graduation, are in each case supplied to a multiplexer unit 160, 260, 360, 460. From there, the raw position signals are transmitted in time multiplex operation to downstream sequential electronics 500, i.e., to respective allocated interpolation electronics 510, 520, 530, 540 on the side of sequential electronics 500. The communication between multiplexer units 160, 260, 360, 460 and sequential electronics 500 may place in digital or serial form via suitable signal-transmission lines, that is, in each case electrically transmittable digital signals are transmitted in time multiplex operation to sequential electronics 500. For instance, conventional methods and protocols such as LVDS (ANSI 644-A-2001) or FPDP (ANSI 17.1-2003) are possible digital interfaces for the transmission of the digitized raw position signals of the position-measuring systems.

Accordingly, on the side of position-measuring systems 100, 200, 300, 400, the generated raw position signals may be at least digitized to then, as explained, transmit them via multiplexer units 160, 260, 360, 460 and a serial interface to sequential electronics 500. Therefore, it is not necessary to convert the raw position signals into position values prior to transmitting these signals to sequential electronics 500. In this manner, it is possible to provide that the complete digitized raw information is transferred to sequential electronics 500 for further processing without complex and costly computing operations, etc., being necessary on the side of position-measuring systems 100, 200, 300, 400, which would necessitate a corresponding expenditure there from the standpoint of circuit engineering.

In the event the raw position signals are first digitized in multiplexer units 160, 260, 360, 460, the transmission of the raw position signals from scanning units 110-130, 210-230, 310-340, 410-440 to multiplexer units 160, 260, 360, 460 may be carried out in the form of the transmission of optical signals via optical fibers, as is the case in the exemplary embodiment illustrated. If, in addition, the light pulse used for the optical scanning is supplied via a further optical fiber, scanning units 110-130, 210-230, 310-340, 410-440 may have a purely passive arrangement.

The raw position signals obtained during the optical scanning may already be converted into electrical signals in the scanning units, so that raw position signals are supplied in the form of analog electrical signals to the multiplexer units. These signals are transmitted via suitable electrical signal lines.

The raw position signals may also already be digitized on the side of the position-measuring systems in the scanning units via a suitable digitizing device. In this case, a serial signal transmission from the scanning units to the multiplexer units via a suitable interface architecture is possible. In principle, the scanning units may also be supplied with power via this interface.

A single position-measuring system 100 of the overall system illustrated in FIG. 1, including downstream multiplexer unit 160, is described in more detail with reference to FIG. 2.

In this context, the raw position signals, generated by the three scanning units 110, 120, 130 of position-measuring system 100, are transmitted as optical signals via optical fibers 111, 121, 131 in the direction of multiplexer unit 160. There, the optical raw position signals are converted into electrical raw position signals via conversion devices 162.1, 162.2, 162.3. They are subsequently supplied to digitizing devices 161.1, 161.2, 161.3, which generate digital raw position signals from the electrical analog raw position signals. The digital raw position signals of various scanning units 110, 120, 130 prepared in this manner are supplied in parallel or concurrently to a multiplex stage 163, which prepares the raw position signals of various scanning units 110, 120, 130 for transmission in time multiplex operation via a suitable line driver 165 to the downstream sequential electronics.

Therefore, the digital output signals of all scanning units 110, 120, 130 of a traversing carriage are fed to shared multiplexer unit 160, which bundles them and relays them in time multiplex operation to the sequential electronics. These measures make it possible to avoid a costly driver electronics for each individual scanning unit 110, 120, 130 of position-measuring device 100.

Multiplexer unit 160 has one line driver 165, used jointly by all scanning units 110, 120, 130 of a traversing table, for the usually great distance between the movable object or traversing table and the sequential electronics. Consequently, it is only necessary to dimension the single line driver 165 per position-measuring system 100 for this relatively long transmission length or corresponding signal lines 171, 172.

Furthermore, because of the multiplex operation provided, it is possible to markedly reduce the number of connecting lines between the traversing table and the sequential electronics. A result is less stiffness of the cable trailing device at the traversing table because of the saving of lines possible in this manner.

In the example illustrated, multiplexer unit 160 also includes various—only schematically illustrated—correction devices 166.1, 166.2. They make it possible to supplement with further secondary information, the raw position signals to be transmitted in multiplex operation to the sequential electronics. Thus, for instance, correction devices 166.1, 166.2 may be used for generating and preparing signal-error information (e.g., offset voltages), signal-correction information (e.g., temperature, voltage fluctuations, information about the instant, duration, amplitude of the scanning pulse), signal-diagnostic information (e.g., signal validity, signal error), status information (e.g., operating state, validity of the supply voltages, fault condition), etc., as secondary information, which is transmitted to sequential electronics 500. Due to the additional transmission of such secondary information, interpolation electronics 510 is provided with additional variables, by the offsetting of which, it is possible to further increase the accuracy of the calculated position. Secondary information of this kind makes available to both interpolation electronics 510 and to sequential electronics 500, information by which the operating state of position-measuring system 100 can be analyzed in detail, and by which, in the case of a fault, it is possible to isolate the cause of the fault.

In the present example, between multiplex stage 163 and line driver 165, a signal coding unit 169 is disposed as a central functional unit. It allows a coding of the information to be transmitted, using an error-redundant data code. In this manner, data-transmission errors can be detected on the side of interpolation electronics 510 (e.g., given the use of a parity bit) and/or corrected (e.g., given the use of a Hamming code). It may be provided that, because of the system architecture, only one such signal coding unit 169 as a central functional unit is necessary for the plurality of scanning units 110, 120, 130.

Figure 2:
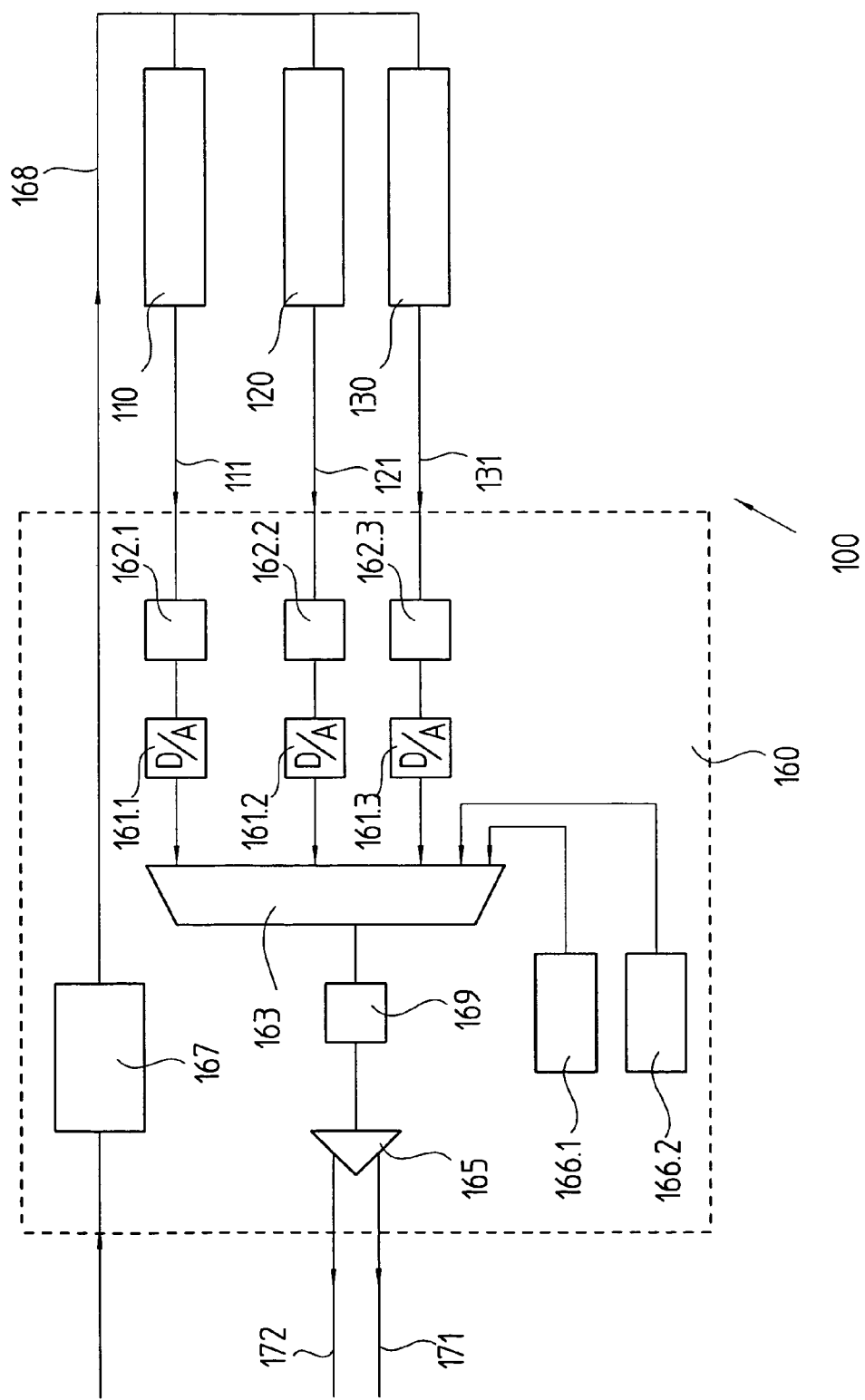
FIG. 2 is a schematic view of a plurality of scanning units and a multiplexer unit of a position-measuring system such as that illustrated in FIG. 1.

In FIG. 2, reference numeral 167 indicates a further central functional unit, schematically illustrated, which is jointly used by the plurality of scanning units 110, 120, 130 of this position-measuring system 100.

As a further central functional unit 167 which is usable by a plurality of functional units 110, 120, 130, for instance, an energy-supply functional unit may be provided in multiplexer unit 160, which takes over the energy supply of scanning units 110, 120, 130, e.g., through a central supply-voltage stabilization and filtering of the same, or by generating a shared scanning illumination, etc.

A scanning-pulse functional unit and/or a clock-receiving functional unit may also be disposed as further central functional unit 167 in multiplexer unit 160. For example, via the scanning-pulse functional unit, an optical scanning pulse may be made available, which is supplied to all scanning units 110, 120, 130 of position-measuring system 100, in order to determine position in pulsed fashion. In this context, the clock-receiving functional unit may be used to record the clock pulse generated centrally by a clock-generating unit in the sequential electronics, and from it, to centrally generate a common optical scanning pulse for scanning units 110, 120, 130 of respective position measuring system 100. An aspect of such a central generation of the scanning pulse is that time displacements between the scanning instants of individual scanning units 110, 120, 130 due to individual scanning pulses are thereby ruled out.

Figure 3:
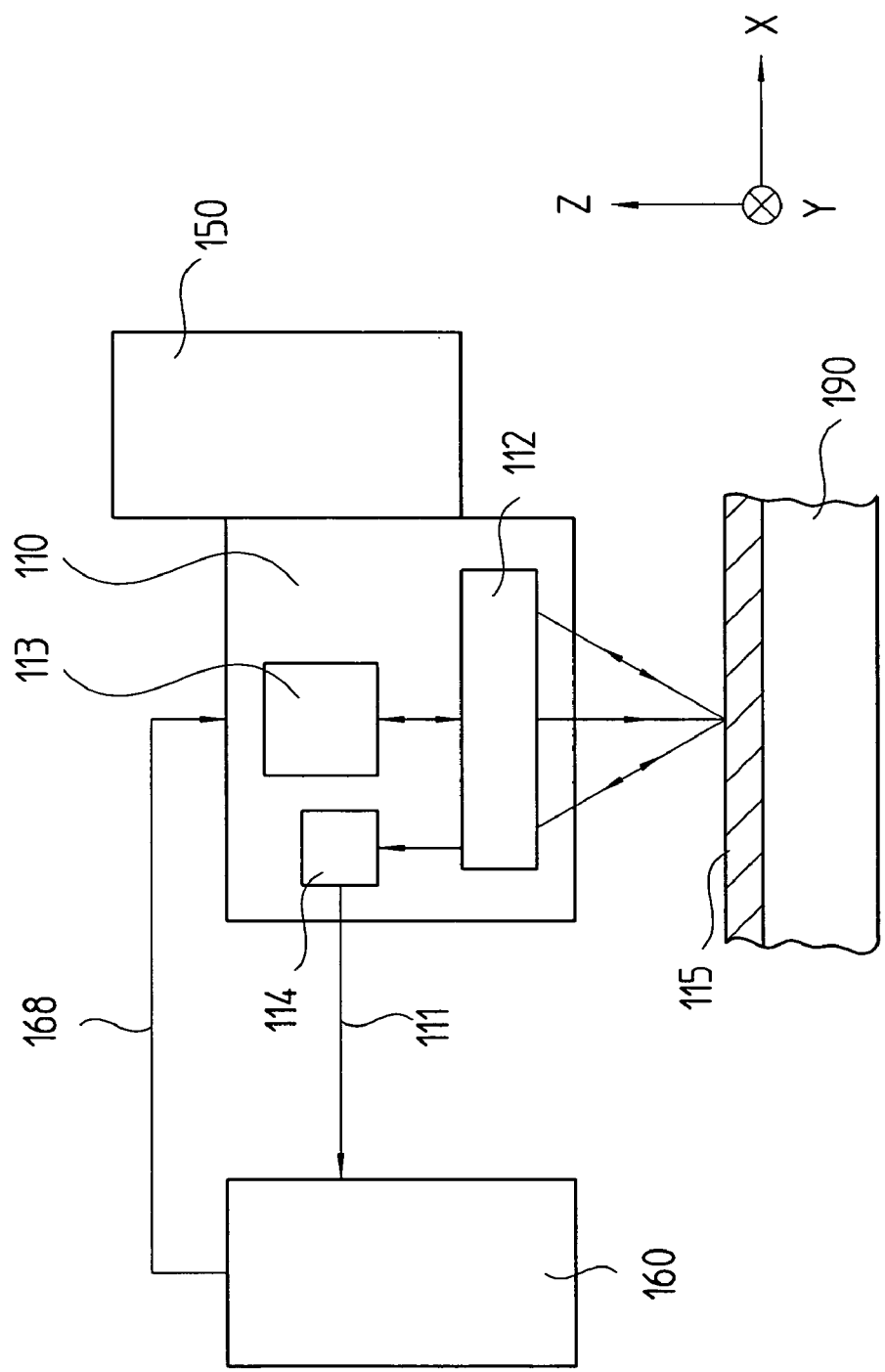
FIG. 3 is a schematic view of one scanning unit in conjunction with the measuring graduation which it scans.

FIG. 3 illustrates one scanning unit 110 of a position-measuring system from the previous figures in conjunction with measuring graduation 115 scanned by it.

Scanning unit 110 and measuring graduation 115 are joined to objects 150 and 190, respectively, indicated in schematized fashion, which, for instance, represent the two machine parts movable relative to each other, whose position is to be measured relative to each other in several degrees of freedom. Object 150 may be the traversing table already mentioned, for instance, and object 190 may be the mentioned metrology frame of the machine. The two objects 150, 190 are disposed in a manner allowing movement relative to each other in at least one measuring direction x. In addition to the movement in measuring direction x, a relative movement in the measuring plane in measuring direction y perpendicular thereto may also be possible, as well as in direction z oriented perpendicular to it. Usually, movements of both objects 150, 190 are possible relative to each other in all six degrees of freedom.

Measuring graduation 115 joined to stationary object 190 is in the form of a one-dimensional or two-dimensional reflected-light grating or cross grating, and is made up of a plurality of partial areas of different reflectivity disposed periodically in the x direction and, if applicable, y direction.

In the present example, scanning unit 110 is joined to movable object 150. Indicated only in schematized form in the figure are scanning optics 112, which may include various optical components such as lenses, prisms, etc. The scanning-beam paths for generating the raw position signals are indicated schematically. An interferential optical scanning principle may be utilized provided for generating the high-resolution position signals.

In scanning unit 110, the light pulse of the light source coming from multiplexer unit 160 via optical fiber 168 arrives at a schematically illustrated outcoupling optics 113, via which one or more scanning-beam paths are coupled out in the direction of scanning optics 112. On the detection side, provision is made for coupling the scanning-beam paths into a suitable incoupling optics 114, and the subsequent conveyance of the optical raw position signals via optical fiber 111 in the direction of multiplexer unit 160. As indicated above, scanning unit 110 is arranged to be purely passive, that is, both the light source for the scanning as well as the detector elements necessary for the signal acquisition are disposed externally of scanning unit 110. The feeding of the light pulse from the light source as well as the feeding of the bundle of rays to be detected to suitable detector elements take place via optical fibers 168, 111.

On the scanning side, two scanning-beam paths may be provided per scanning unit 110, which permit simultaneous measurement of position both in measuring direction x and in direction z oriented perpendicular thereto. Suitable interferential optical scanning principles are described in detail, for example, in German Patent Application No. 10 2005 043 569.6.

In addition to the examples described above, there are a number of further possibilities within the present context. Thus, for example, basically different principles are available for generating the raw position signals. Alternative non-optical scanning principles may be used for a part of the raw position signals, etc., as well.

What is claimed is:

1. A position-measuring system for measuring the position of an object, movable in several degrees of freedom, relative to a stationary object, comprising:
   at least one measuring graduation joined to a first one of the objects;
   a plurality of scanning units joined to a second one of the objects and adapted to generate raw position signals based on optical scanning of the measuring graduation; and
   a multiplexer unit, the scanning units adapted to supply the raw position signals to the multiplexer unit, the multiplexer unit adapted to transmit the raw position signals in a time multiplex operation to a downstream sequential electronics without conversion of the raw position signals into position values beforehand.

2. The position-measuring system according to claim 1, wherein the multiplexer unit includes a digitizer device adapted to convert the supplied raw position signals into electrically transmittable raw digital signals that are transmittable in the time multiplex operation to the sequential electronics.

3. The position-measuring system according to claim 2, wherein the raw position signals supplied by the scanning units to the multiplexer unit include optical signals and are transmitted to the multiplexer unit via optical fibers, the multiplexer unit including a conversion device adapted to convert the optical signals into electrical signals suppliable to the digitizer device.

4. The position-measuring system according to claim 2, wherein the raw position signals supplied by the scanning units to the multiplexer unit include electrical signals and are transmitted to the multiplexer unit via electrical signal lines, the electrical signals suppliable to the digitizer device.

5. The position-measuring system according to claim 1, further comprising digitizer devices disposed on a side of the scanning units and adapted to convert the raw position signals, obtained during the optical scanning, into raw digital signals transmittable to the multiplexer unit.

6. The position-measuring system according to claim 1, wherein the multiplexer unit includes a single line-driver unit adapted to transmit the raw position signals of all scanning units to the sequential electronics.

7. The position-measuring system according to claim 1, wherein the multiplexer unit includes a correction device adapted to supplement the raw position signals, to be transmitted to the sequential electronics, with further secondary information.

8. The position-measuring system according to claim 7, wherein the correction device is adapted to generate and prepare at least one type of the following secondary information for transmission to the sequential electronics: (a) error information; (b) correction information; (c) diagnostic information; and (d) status information.

9. The position-measuring system according to claim 1, wherein the multiplexer unit includes at least one further central functional unit usable jointly by several scanning units.

10. The position-measuring system according to claim 9, wherein the multiplexer unit includes at least one of the following central functional units: (a) an energy-supply functional unit; (b) a scanning-pulse functional unit; and (c) a clock-receiving functional unit.

11. The position-measuring system according to claim 9, wherein the multiplexer unit includes as a central functional unit, a decoder unit adapted to code information that is to be transmitted to the sequential electronics with an error-redundant data code.

12. The position-measuring system according to claim 1, wherein the multiplexer unit includes a multiplex stage adapted to prepare concurrently supplied raw position signals of the scanning units for transmission of the raw position signals of the various scanning units in the time multiplex operation to the downstream sequential electronics.

13. The position-measuring system according to claim 1, wherein the raw position signals include signals that contain position information.

14. The position-measuring system according to claim 1, wherein the raw position signals include phase values that result directly from the optical scanning of the measuring graduation by the scanning units.

15. The position-measuring system according to claim 1, further comprising interpolation electronics provided on a same side of the multiplexer unit as the sequential electronics, the interpolation electronics configured to calculate a position of at least one scanning unit from the raw position signals.

16. The position-measuring system according to claim 1, further comprising interpolation electronics provided on a same side of the multiplexer unit as the sequential electronics, the interpolation electronics configured to calculate a position of each scanning unit from the raw position signals.

17. The position-measuring system according to claim 1, further comprising interpolation electronics corresponding to each position-measuring system, the interpolation electronics provided on a same side of the multiplexer unit as the sequential electronics, each interpolation electronics configured to calculate a position of the corresponding scanning unit from the raw position signals.

* * * * *